April 29, 1941.　　　R. A. KELSEY ET AL　　　2,240,042
AIR CLEANER
Filed March 22, 1940　　　3 Sheets-Sheet 1

Inventors
Robert A. Kelsey
Harry Wright
By Lyon & Lyon
Attorneys

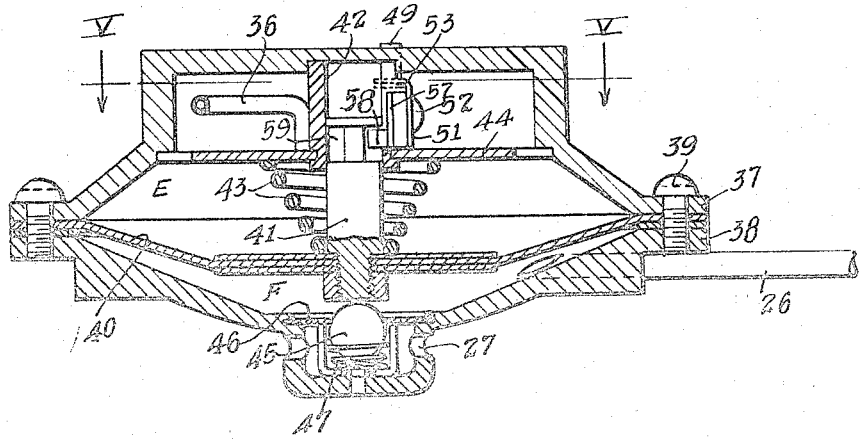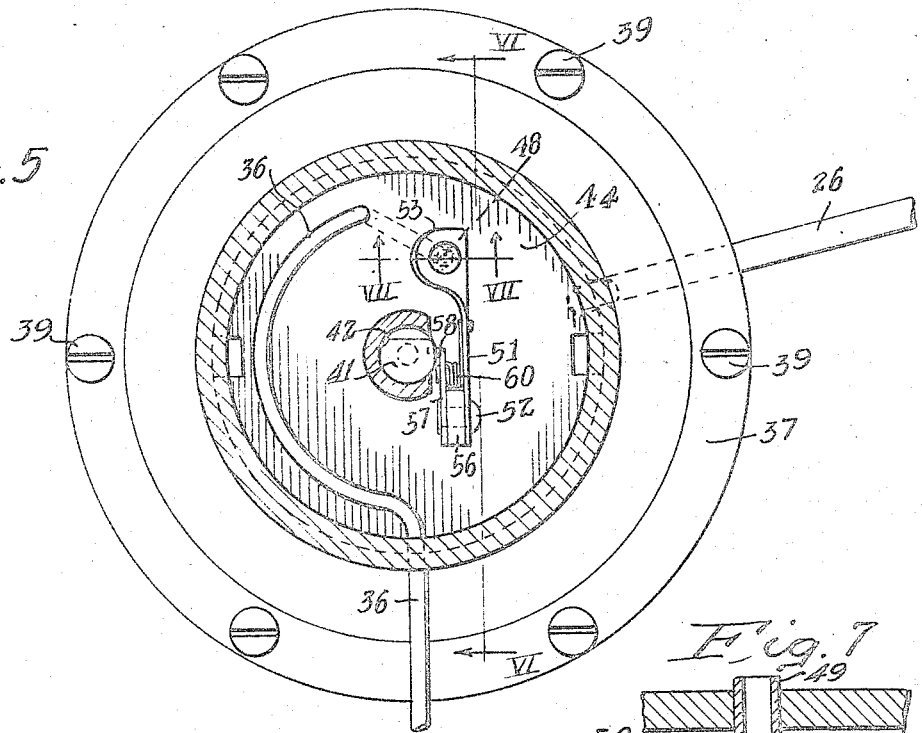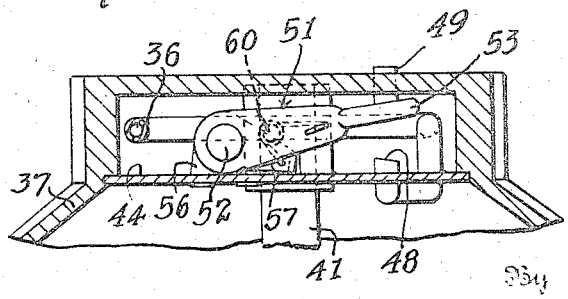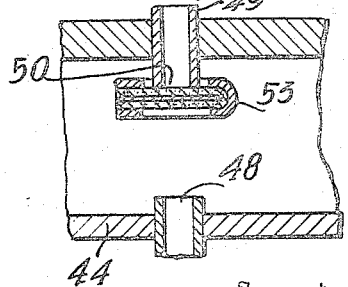

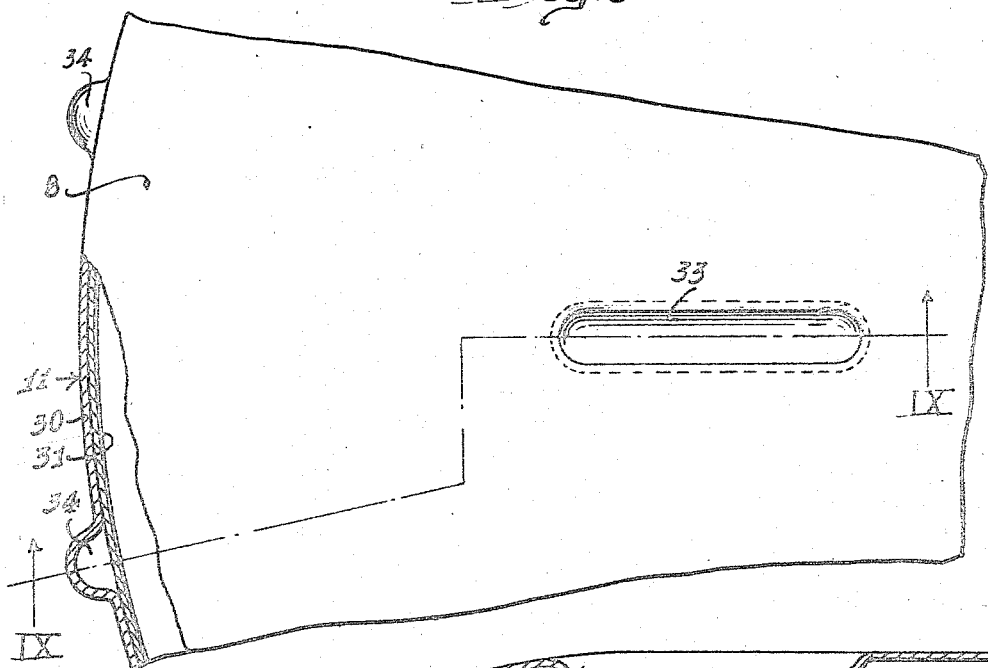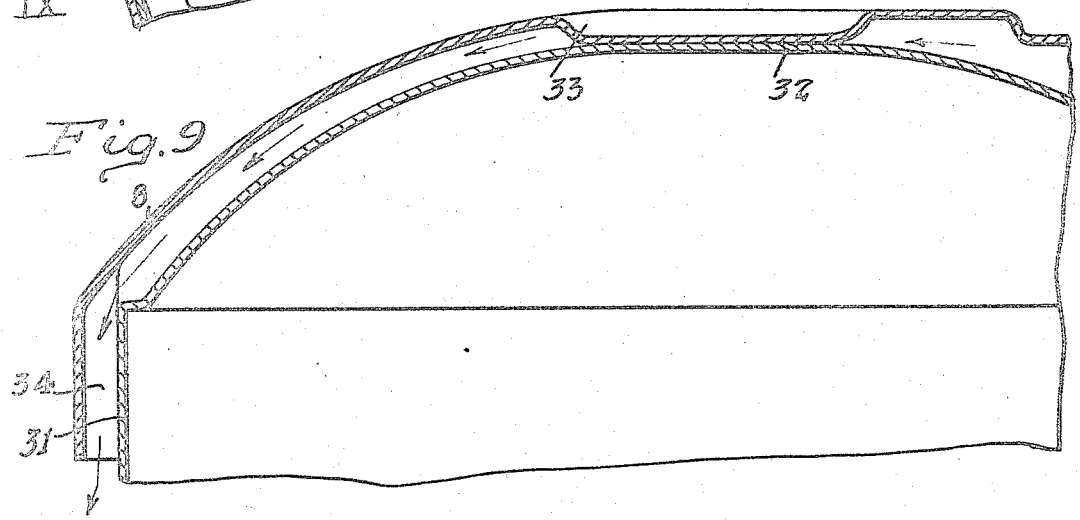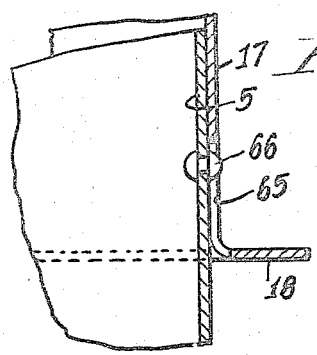

Patented Apr. 29, 1941

2,240,042

UNITED STATES PATENT OFFICE 2,240,042

AIR CLEANER

Robert A. Kelsey and Harry Wright, San Diego, Calif., assignors to Aeromotive Components Corporation, a corporation of California Application March 22, 1940, Serial No. 325,364

2 Claims. (Cl. 183—14)

This invention relates broadly to devices for separating solid particles, dust, and the like from gases, and is particularly intended for the purifying of air. Air cleaners in accordance with the invention are especially useful for cleaning the air drawn into the intake manifold of an internal combustion engine, and the invention will be explained by describing in detail a specific embodiment thereof adapted for use on an internal combustion engine.

A general object of the invention is to provide a gas cleaner that is relatively simple, reliable in operation, and has a high cleaning efficiency.

A more specific object is to provide a gas cleaner of the wet type employing a liquid to wet the dust particles to be removed, in which the liquid and wetted dust particles are substantially completely removed from the gas stream without introducing a serious pressure drop in the gas stream.

A feature of the invention is a gas cleaner of the wet type, in which the gas is first passed through a relatively coarse, substantially vertical screen over which a continuous stream of oil flows, after which the direction of flow of the wetted gas is shifted to eliminate therefrom by centrifugal force a substantial portion of the liquid and wetted dust entrained in the gas stream. Thereafter the gas stream is passed through contact precipitation material to further remove liquid particles and wetted dust, but because of the preliminary elimination of most of the liquid and wetted dust by centrifugal action, the contact precipitation material can be relatively thin, whereby it does not produce an excessive pressure drop in the gas stream.

In the drawings:

Fig. 4 is an enlarged vertical section through the liquid pump of the cleaner;

Fig. 5 is a horizontal section taken substantially in the plane V—V of Fig. 4;

Fig. 6 is a detail vertical section taken substantially in the plane VI—VI of Fig. 5;

Fig. 7 is a detail vertical section taken substantially in the plane VII—VII of Fig. 5;

Fig. 8 is an enlarged detail section taken in the horizontal plane VIII—VIII of Fig. 3;

Fig. 9 is a detail vertical section taken along the line IX—IX of Fig. 8; and

Fig. 10 is a detail vertical section taken in the plane X—X of Fig. 3.

Figure 1:
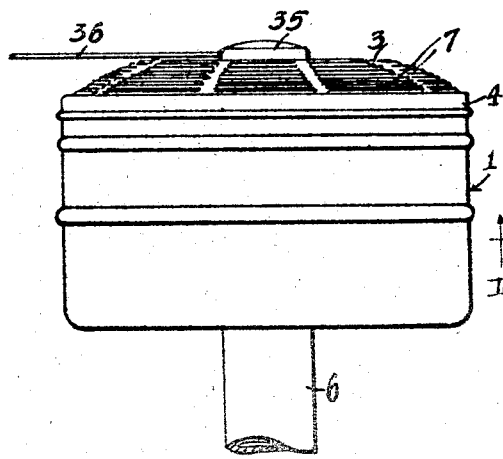
Fig. 1 is an elevation view of an air cleaner for an internal combustion engine, constructed in accordance with the invention.
Figure 2:
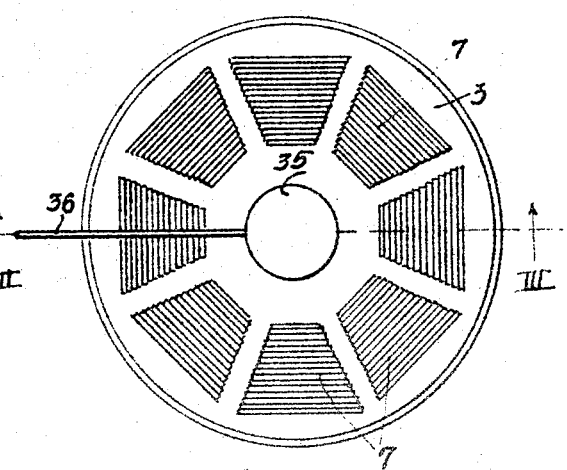
Fig. 2 is a plan view of the cleaner.
Figure 3:
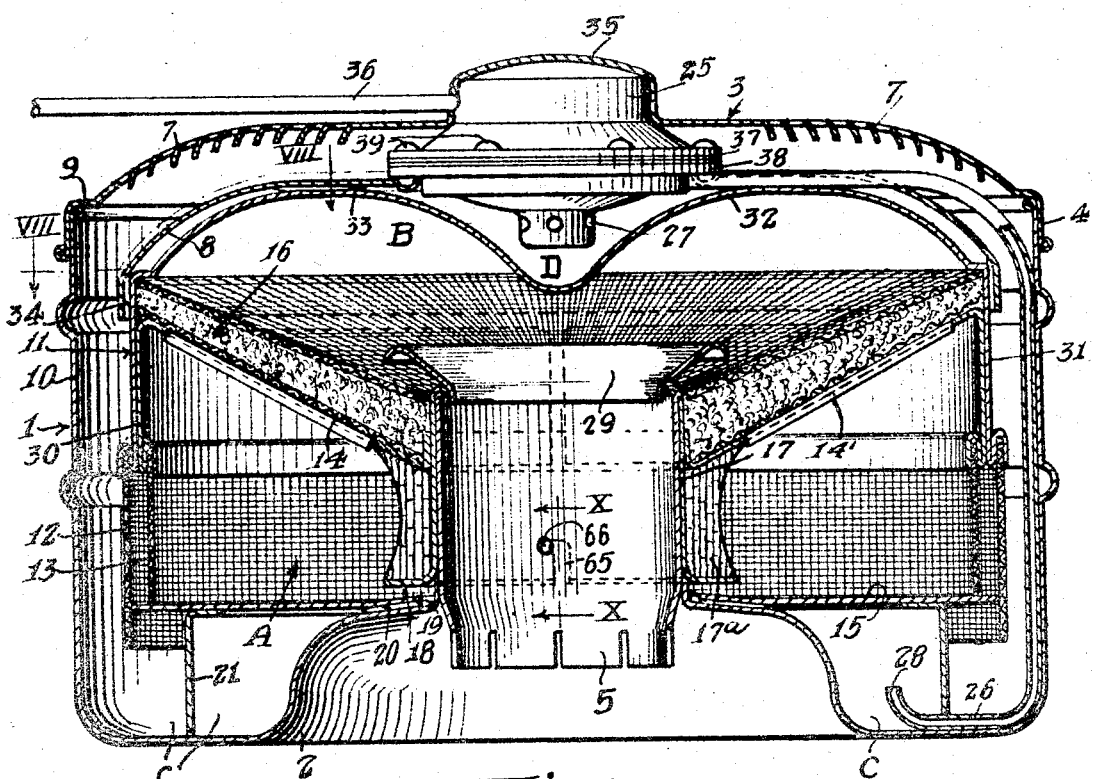
Fig. 3 is a vertical section taken substantially in the plane III—III of Fig. 2.

Referring first to Figs. 1, 2 and 3, the cleaner therein disclosed comprises a substantially cylindrical shell 1 having a bottom wall 2 integral therewith and adapted to be closed at the top by a cover 3 having a skirt 4 which fits over the upper edge of the case 1. As best shown in Fig. 3, the bottom wall 2 is reentrant and has a central orifice through which projects a tubular member 5. The lower end of the member 5 projects below the reentrant portion of the bottom wall 2 and is adapted to fit into the upper end of a discharge pipe 6 (Fig. 1), this discharge pipe constituting the intake pipe of the internal combustion engine with which the device is to be used.

Air enters the device through louvers 7 uniformly distributed circumferentially in the cover 3. After entering through the louvers 7 the air flows radially outwardly and downwardly between the cover 3 and a baffle wall 8, the lower edge of this baffle 8 terminating a short distance below the upper edge 9 of the case 1.

After flowing past the edge of the baffle 8 the air continues downwardly between the cylindrical wall 10 of the case 1 and an inner cylindrical wall 11 spaced radially inwardly from the wall 10. At substantially the midlevel of the cleaner, the cylindrical wall 11 merges into a pair of concentric cylindrical screens 12 and 13, respectively, through which the air flows radially inwardly into a chamber A of annular configuration, the outer wall of which chamber is defined by the wall 11 and the screen 13, the upper wall of which is defined by a screen 14 and the bottom wall by a disc-shaped member 15.

The screen 14 extends upwardly and outwardly in substantially inverted conical form and supports a condenser screen 16 of metal gauze or turnings, or the like, which exposes a large surface to the air stream. Above the condenser screen 16 is a chamber B through which the air flows inwardly and downwardly into the tubular member 5 from which it is discharged.

The structure so far described would have no effective filtering action in dry condition. However, when the device is in use a stream of oil or other suitable liquid is maintained over the outer surface of the wall 11 and down over the screen 12, maintaining the latter wet all times and tending to fill the interstices of the screen with the oil. As the air moves through the screen 12 at relatively high velocity, it picks up a certain amount of the oil in the form of fine droplets and carries it through the screen 13. Impact of the oil particles against the screen 13 tends to further disrupt the particles, producing a mist which effectively wets practically all of the dust particles in the air, thereby substantially increasing their mass. Of course many of the dust particles are absorbed into the oil droplets or in the oil film on the screens 12 and 13 by direct contact therewith.

As previously explained, the air stream after passing through the screen 13 into the chamber A, has to turn upwardly and pass through condenser screen 16 before it can escape into the tubular member 5. This involves a change in direction which throws out most of the larger dust particles and the larger droplets of oil. Some of these particles, dislodged by centrifugal force, are thrown against a gimp winding 17a on a tubular member 17, the latter surrounding the tubular member 5 and having an outwardly flared skirt 18 on its lower edge, which serves to retain the winding 17a.

The particles and droplets which are not heavy enough to drop on the floor 15 or impinge upon the gimp winding 17a, enter the condenser screen 16 and are trapped therein. The greater portion of the heavier particles and droplets enter the central and lower portion of the condenser screen 16, which portion is preferably somewhat thicker than the peripheral portion, to reduce the velocity of the air therethrough and reduce the possibility of dust particles or oil droplets being carried through the condenser screen. To further reduce the possibility of oil particles being carried directly through the inner portion of the condenser screen 16, an upwardly and outwardly flared baffle member 29 is preferably provided on the upper end of the member 17, this baffle member 29 deflecting the air stream outwardly and preventing it from taking an extremely short path from the upper edge of the condenser screen 16 into the tubular member 5. The baffle 29 not only reduces the possibility of oil being carried over into the discharge passage but apparently substantially reduces turbulence and eddy currents within the chamber B, because it results in a reduction in the total pressure drop required to force air through the cleaner. Most of the air flows up along the underside of the condenser screen 16 and passes through the outer thinner portion thereof into the chamber B, from which it passes down into the tubular member 5, and is discharged.

Sufficient oil is carried into the condenser screen 16 by the air to maintain the screen thoroughly wetted at all times, so that any dust particles that may have passed through the screens 12 and 13 to the chamber A without contacting the oil, are almost certain to be entrapped on the oil-coated surfaces of the condenser screen 16.

As oil is constantly being carried into the condenser screen 16 by the stream of air flowing therethrough, the oil accumulates until it flows inwardly and downwardly to the member 17 and downwardly therealong and over the skirt 18 from which it is free to drip onto the horizontal wall 15, constituting the floor of the chamber A. The oil on the floor 15 can flow outwardly along the floor and through the lower edges of the screens 13 and 12, into an oil sump C. However, the flow of air radially inwardly above the floor 15 tends to carry the oil accumulating thereon inwardly through an annular passage 19 below the skirt 18 and thence downwardly past the inner edge of the floor 15, and then outwardly through an annular passage 20 formed between the floor 15 and the reentrant bottom of wall 2, into the sump C. An annular baffle wall 21 divides the sump and reduces sloshing and slopping of the oil in the sump. This baffle does not seal with the bottom wall 2 so that oil can always flow slowly past the baffle.

Circulation of oil over the outer screen 12 is maintained by continuously pumping oil from the sump C into an oil reservoir D in the upper part of the cleaner from which it flows by gravity radially outwardly in all directions over the upper edge of the wall 11. Circulation is effected by a pump 25 which will be described in detail later, this pump drawing oil from the sump C through an intake pipe 26 and discharging the oil through openings 27 of the pump 25 directly into the chamber D. The intake end 28 of the pipe 26 is positioned above the bottom of the oil sump C so that heavy sediment accumulating in the bottom of the sump is not recirculated.

As particularly disclosed in Fig. 3, the wall 11 is formed of two thicknesses of metal, the inner member 30 being formed continuous with a slotted wall 14' supporting the screen 14, which in turn supports the screen 16, and the outer thickness 31 being formed continuous with an inner dome member 32 which forms the ceiling of the air chamber B and the floor of the oil reservoir D. The lower edge of the inner wall member 30 is folded to engage and support the upper edge of the screen 13 and the lower edge of the outer wall member 31 is folded to engage and support the upper edge of the outer screen 12.

The baffle wall member 8, previously referred to, defines with the outer portion of the dome member 32 a thin annular passage for the overflow of oil from the reservoir D. The baffle 8 is supported in uniformly spaced relation with respect to the dome 32 at the highest portion thereof by a plurality of indentations 33 therein (Figs. 3, 8 and 9), the indentations resting upon the dome 32.

The outer and lower edge portion of the baffle 8 is of a diameter to fit snugly against the upper cylindrical portion of the wall 31 but is pressed out at circumferentially spaced points to define a plurality of oil discharge openings 34 for the discharge of oil onto the wall 11, as previously described. By employing the passages 34 at spaced intervals, the total flow of oil can be maintained relatively small without having passages of very small width, which would be subject to clogging. It is desirable to maintain the total cross sectional area of the passages 34 small enough so that the pump 25 can maintain a slight head of oil thereon, thereby insuring substantially uniform flow through all of the passages 34 irrespective of slight tilting motion of the cleaner as a whole. It will be obvious that if gravity distribution were depended upon for uniform overflow past the indentation 33 at all peripheral points on the dome 32, then uniform oil flow to all sides of the cleaner could only be obtained when the axis of the cleaner was exactly perpendicular.

Although the oil flows from the discharge passages 34 onto the upper portion of the wall 11 at definite, spaced apart points thereon, the oil spreads out in a film as it flows down from the wall 11 onto the screen 12 and spreads to a still greater extent over the screen.

Although the present cleaner does not require any special type of oil pump for circulating the oil, there has been disclosed a relatively simple vacuum-operated pump adapted to be connected to the intake manifold of an internal combustion engine with which the cleaner is used. As shown in Fig. 3, the pump 25 fits into a central recess, filling the recess. It also extends upwardly into a turret 35 in the cover member. A tube 36 extends through the side of the turret 35 and provides the vacuum connection to the pump 25.

Referring now to Fig. 4, the pump comprises a casing defined by a pair of flanged elements including an upper element 37 and a lower element 38 which are clamped together by screws 39. The flanges on the elements 37 and 38 engage and support and seal with the outer edge of a flexible diaphragm 40 which divides the interior of the case into an upper vacuum compartment E and a lower oil compartment F. The flexible diaphragm 40 is clamped at its center to a stem 41 which is vertically slidable in a guideway 42 formed in the upper casing member 37. A compression spring 43, compressed between the upper side of the diaphragm 40 and a wall member 44 of the upper casing member constantly urges the diaphragm 40 into the lowermost position, as shown in Fig. 4.

The lower or oil compartment F is in constant communication with the oil sump C (Fig. 3) through the oil line tubing 26 and is adapted to be connected with the oil discharge passages 27, previously referred to, by a ball check valve 45 seated against the underside of an orifice plate 46 by a compression spring 47. The ball 45 normally seals the opening in the aperture plate 46 but opens in response to downward movement of the diaphragm 40 to permit the discharge of oil from the chamber F through the passages 27.

It will be apparent from the structure so far described that when the chamber E is connected to the vacuum line 36, the diaphragm 40 will be drawn upwardly against the force of spring 43 to draw oil into the chamber F through the oil intake line 26, the valve ball 45 preventing return of oil or air into chamber F from the oil reservoir D (Fig. 3). On the other hand, when the chamber E is disconnected from the vacuum line 36 and is connected to atmosphere, the spring 43 moves the diaphragm 40 back down into lower position, forcing the oil in chamber F out past the valve 45 and through the discharge opening 27. Some oil is also returned back through the oil intake line 26 because of the fact that there is no check valve provided in the latter. However, the spring 47 is very light and ball 45 opens readily to provide a large discharge passage so that the resistance to flow of oil from chamber F out through the discharge passages 27 is a great deal less than the resistance to flow back through the oil intake line 26, so that practically all of the oil is discharged through the passages 27. Whereas the upward movement of the diaphragm in response to vacuum may be relatively slow because of the resistance to flow of oil through the tube 26, the downward movement of the diaphragm by the spring 43 is very rapid because of the low frictional resistance to fluid flow past the valve 45.

Referring now to Figs. 5, 6 and 7, the vacuum line 36 terminates in an upwardly directed orifice 48 and directly above this orifice is a vent pipe 49 communicating through the wall of the upper casing member 37 with the atmosphere. The lower end of this vent pipe 49 terminates in an orifice 50 which is positioned directly above the orifice 48. A flop valve 51 is pivotally mounted on the wall member 44 by a pivot 52 for rocking motion between an upper position, in which a yieldable insert 53 (Fig. 7) in the valve seals the orifice 50 and a lower position in which the insert 53 seals the orifice 48. The valve member 51 is actuated by movement of the diaphragm 40 through stem 41 by means of a toggle mechanism functioning in a general manner similar to the valve mechanism employed in vacuum-operated windshield wiper motors. Thus there is also mounted on the same lug 56 and by the same pivot pin 52 that supports the valve 51, a control arm 57, the outer end of which is extended at right angles to form a tip 58 (Fig. 5) engaged in a groove 59 (Fig. 4) formed in the pin 41 near the upper end thereof. This constrains the arm 57 to oscillate up and down with movement of the diaphragm 40. The arm 57 pivotally engages one end of a spring link 60, the other end of which engages the valve 51. The ends of the spring member 60, both of which are pivotally connected to the arm 57 and the valve 51, respectively, tend to separate so that when the pin 41 is in lower position, as shown in Fig. 6, the expansion of the spring 60 holds the valve 51 in upper position, closing the diaphragm vent 49. In this position, the vacuum line 36 is connected to the chamber E and the air is exhausted therefrom, lifting the diaphragm 40 and the pin 41. Slightly before the pin 41 reaches its upper limit of movement, the arm 57 passes the valve 51 so that the expanding force of the spring 60 thereafter urges the valve 51 downwardly and the latter flops suddenly from upper position into lower postion, in which the vacuum orifice 48 is closed but the diaphragm vent 49 is opened. Thereupon the spring 43 (Fig. 4) moves the diaphragm 40 and the pin 41 downwardly until the arm 57 passes slightly below the valve 51, whereupon the expanding force of the spring 60 flops the valve back into upper position. The action described continues as long as vacuum is maintained in the vacuum line 36.

In the use of the cleaner, all dirt and dust that is separated from the air accumulates in the oil sump C, which sump must be cleaned out from time to time. The elements of the cleaner have been assembled in such a manner as to permit easy disassembly for the purpose of cleaning the sump C. The bottom wall member 2 of the outer casing is permanently secured, as by welding to the inner tubular member 5, constituting the air discharge passage. However, the skirt member 17 is slidably fitted on the tubular member 5 and is normally retained in position by a bayonet slot 65 in the member 17, which engages a detent 66 (Figs. 3 and 10) on the tubular member 5. Furthermore, the wall member 14 supporting the condensing screen 16, is permanently secured as by welding to the member 17. Obviously the wall 11 is also secured to the wall 14' and wall 11 is attached through the screens 12 and 13 to the floor plate 15 and the baffle 21. Therefore by rotating the member 17 to release the detent 66 from the horizontal portion of the bayonet slot 65, the entire inner assembly and the cover 7 may be lifted away from the casing 1 and the tubular member 5. Obviously this leaves the sump C readily accessible through the open top of the casing 1 for thorough cleaning, after which the inner assembly may be restored to position by moving it down into the casing with the vertical part of the bayonet slot 65 in alignment with the detent 66, and then rotating the inner assembly and the cover 7 with respect to the casing 1 to carry the detent 66 into the horizontal arm of the bayonet slot.

For convenience, the cleaner has been described for use on an internal combustion engine, but it will be understood that it is equally useful on other devices, such, for instance, as air compressors.

Although for the purpose of explaining the invention a particular embodiment thereof has been described in detail, it is understood that various departures can be made from the particular construction disclosed without departing from the invention except as defined in the appended claims.

We claim:

1. A device of the type described, comprising: a first casing member having inner and outer concentric cylindrical walls interconnected at their lower edges to define an annular receptacle open at the top; a cover element adapted to fit the upper end of said outer cylindrical wall; an inner member having a peripheral wall of diameter intermediate the inner and outer cylindrical walls of said first casing member, a top closure wall therefor; the lower portion of said first casing member constituting a sump for liquid and the peripheral wall of said inner member dipping into said liquid to seal therewith, said peripheral wall of said inner member having a filter element therein for the passage of gas therethrough, and means for admitting gas into the space between said first casing member and said inner member, in which said cover element is provided with gas inlet openings and said top closure wall of said inner member is spaced a substantial distance below said cover element, the said top closure wall being depressed at the center to define a liquid reservoir, means for delivering liquid to said reservoir, and an auxiliary wall positioned intermediate said cover element and said top closure wall and defining therebelow a passage for liquid from said reservoir to the outer edge of said top closure wall, and defining with said cover element a gas passage.

2. A device of the type described, comprising: a first casing member having inner and outer concentric cylindrical walls interconnected at their lower edges to define an annular receptacle open at the top; a cover element adapted to fit the upper end of said outer cylindrical wall; an inner member having a peripheral wall of diameter intermediate the inner and outer cylindrical walls of said first casing member, and a top closure wall therefor, the lower portion of said first casing member constituting a sump for liquid and the peripheral wall of said inner member dipping into said liquid to seal therewith, said peripheral wall of said inner member having a filter element therein for the passage of gas therethrough, and means for admitting gas into the space between said first casing member and said inner member, means attached to said inner member and defining therewith an oil reservoir, means on said inner member for delivering oil from said reservoir to said filter elements in said porous wall, liquid pumping means mounted on said inner member and having discharge passages communicating with said liquid reservoir, said inner member also having a liquid intake pipe mounted thereon and extending into the lower portion of said first casing member, said entire inner member being detachable as a unit from said first casing member by upward movement therefrom.

ROBERT A. KELSEY.
HARRY WRIGHT.